United States Patent
Joshi et al.

(10) Patent No.: US 9,952,850 B2
(45) Date of Patent: Apr. 24, 2018

(54) AUTOMATED FIRMWARE UPDATE WITH ROLLBACK IN A DATA STORAGE SYSTEM

(71) Applicant: DataDirect Networks, Inc., Chatsworth, CA (US)

(72) Inventors: Rajkumar Joshi, Simi Valley, CA (US); David Fellinger, Westlake Village, CA (US); Dan Olster, Woodland Hills, CA (US)

(73) Assignee: DataDirect Networks, Inc., Chatsworth, CA (US)

( * ) Notice: Subject to any disclaimer, the term of this patent is extended or adjusted under 35 U.S.C. 154(b) by 116 days.

(21) Appl. No.: 14/811,406

(22) Filed: Jul. 28, 2015

(65) Prior Publication Data

US 2017/0031671 A1     Feb. 2, 2017

(51) Int. Cl.
*G06F 9/44*       (2018.01)
*G06F 9/445*     (2018.01)
(Continued)

(52) U.S. Cl.
CPC .............. *G06F 8/65* (2013.01); *G06F 3/0604* (2013.01); *G06F 3/0629* (2013.01);
(Continued)

(58) Field of Classification Search
CPC .......... G06F 8/65; G06F 8/665; G06F 21/572; G06F 8/71; G06F 11/3006; G06F 3/0607;
(Continued)

(56) References Cited

U.S. PATENT DOCUMENTS 8,527,981 B2 * 9/2013 Oikawa .................... G06F 8/65
                                                                                                    717/168
8,549,192 B2 * 10/2013 Nakamura ........ G06F 17/30516
                                                                                                    710/29

(Continued)

OTHER PUBLICATIONS

Dennis K. Nilsson et al.; Secure Firmware Updates over the Air in Intelligent Vehicles; 2008 IEEE; pp. 380-384; <http://ieeexplore.ieee.org/stamp/stamp.jsp?tp=&arnumber=4531926>.*

(Continued)

*Primary Examiner* — Thuy Dao
*Assistant Examiner* — Cuong V Luu
(74) *Attorney, Agent, or Firm* — SoCal IP Law Group LLP; Mark A. Goldstein

(57) ABSTRACT

Systems and methods for automated firmware update with rollback are described herein. The systems include a plurality of storage zones, each storage zone including a plurality of storage nodes, each storage node including a plurality of storage media. The method includes monitoring storage system activity and parameters and maintaining a data storage system usage and parameter database containing system activity information. When a firmware update is available, data storage system activity is evaluated. Storage nodes needing the firmware update are identified. The firmware update is run on available storage nodes identified as needing the firmware update. The impact of the firmware update is evaluated and a rollback of the firmware update is initiated on all firmware updated storage nodes when parameter variations are significant and/or result in degraded performance.

18 Claims, 6 Drawing Sheets

(51) Int. Cl.
*G06F 3/06* (2006.01)
*G06F 17/30* (2006.01)
*G06F 11/14* (2006.01)

(52) U.S. Cl.
CPC .......... *G06F 3/0653* (2013.01); *G06F 3/0683* (2013.01); *G06F 8/665* (2013.01); *G06F 11/1469* (2013.01); *G06F 17/30117* (2013.01); *G06F 2201/84* (2013.01)

(58) Field of Classification Search
CPC ............. G06F 11/0727; G06F 11/1469; G06F 11/2069; G06F 3/0683
See application file for complete search history.

(56) References Cited

U.S. PATENT DOCUMENTS

| | | | | | |
|---|---|---|---|---|---|
| 9,195,451 | B2* | 11/2015 | Lu | ................................ | G06F 8/65 |
| 2004/0261070 | A1* | 12/2004 | Miller | ........................ | G06F 8/71 |
| | | | | | 717/170 |
| 2006/0015861 | A1* | 1/2006 | Takata | ........................ | G06F 8/67 |
| | | | | | 717/168 |
| 2008/0163190 | A1* | 7/2008 | Shirota | ........................ | G06F 8/65 |
| | | | | | 717/170 |
| 2009/0063727 | A1* | 3/2009 | Nakamura | ........... | G06F 17/30516 |
| | | | | | 710/29 |
| 2009/0077547 | A1* | 3/2009 | Kakinoki | .................. | G06F 8/65 |
| | | | | | 717/168 |
| 2010/0058322 | A1* | 3/2010 | Oikawa | ........................ | G06F 8/65 |
| | | | | | 717/173 |
| 2010/0318986 | A1* | 12/2010 | Burke | ................. | G06F 11/3409 |
| | | | | | 717/176 |
| 2013/0198730 | A1* | 8/2013 | Munireddy | ............... | G06F 8/65 |
| | | | | | 717/170 |
| 2015/0149989 | A1* | 5/2015 | Lu | .............................. | G06F 8/65 |
| | | | | | 717/170 |
| 2015/0180745 | A1* | 6/2015 | Horn | .......................... | G06F 8/65 |
| | | | | | 709/224 |

OTHER PUBLICATIONS

Jinsik Kim et al.; Remote Progressive Firmware Update for Flash-Based Networked Embedded Systems; 2009 ACM; pp. 407-412; <https://dl.acm.org/citation.cfm?id=1594337>.*

Zachry Basnight et al.; Firmware modification attacks on programmable logic controllers; 2013 Elsevier; pp. 76-84; <https://www.sciencedirect.com/science/article/pii/S1874548213000231>.*

Dennis K. Nilsson et al.; A Framework for Self-Verification of Firmware Updates over the Air in Vehicle ECUs; 2008 IEEE; 5 pages; <http://ieeexplore.ieee.org/stamp/stamp.jsp?tp=&arnumber=4746641>.*

Byung-Chul Choi et al.; Secure Firmware Validation and Update for Consumer Devices in Home Networking; 2016 IEEE; pp. 39-44; <http://ieeexplore.ieee.org/stamp/stamp.jsp?tp=&arnumber=7448561>.*

Stephen McLaughlin et al.; Embedded Firmware Diversity for Smart Electric Meters; 2010 Usenix.org; 6 pages; <https://www.usenix.org/legacy/events/hotsec10/tech/full_papers/McLaughlin.pdf>.*

* cited by examiner

AUTOMATED FIRMWARE UPDATE WITH ROLLBACK IN A DATA STORAGE SYSTEM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to firmware updates for devices in a data storage system and a method for updating firmware at preferred times and/or with minimal interruption while providing for rollback of the firmware update if parameter evaluation shows the update was unsuccessful and/or if there was an unexpected performance degradation resulting from the firmware update.

Description of the Related Art

A file system is used to store and organize computer data stored as electronic files. File systems allow files to be found, read, deleted, and otherwise accessed. File systems store files on one or more storage devices. File systems store files on storage media such as hard disk drives, magnetic tape and solid-state storage devices.

Various applications store large numbers of documents, images, audio, videos and other data as objects using a distributed data storage system in which data is replicated and stored in multiple locations for resiliency.

To achieve data distribution and replication with the resulting resiliency, specialized firmware is used on devices in the distributed data storage system. The firmware is updated every so often to achieve certain goals such as improve performance, add new features, enhance existing features and fix bugs, for example. Applying firmware updates to the myriad devices in a distributed data storage system is a complex undertaking. Firmware updates typically have required a system operator or IT manager to spend a great amount of time scheduling and implementing the firmware update.

In some circumstances, the firmware update may have a less than desired or even a negative effect of performance of the distributed data storage system. The same system operator or IT manager that handled the firmware updates installation is typically assigned the task of evaluating the success and/or impact of the firmware updates. It is time consuming and difficult for a system operator to evaluate the effectiveness of a firmware update. This is particularly so when the system operator must evaluate the effectiveness of the firmware update that has been installed on some devices in the distributed data storage system while at the same time continuing to install the firmware update on other devices in the distributed data storage system.

The methods described herein address the issues of managing firmware updates, evaluating the effectiveness of the firmware updates, and determining whether a firmware update should be uninstalled or rolled back.

DETAILED DESCRIPTION

The systems and methods described herein provide for implementing firmware updates among devices in a distributed data storage system, evaluating the effectiveness of the firmware updates, and determining whether a firmware update should be uninstalled or rolled back.

Environment

Figure 1:
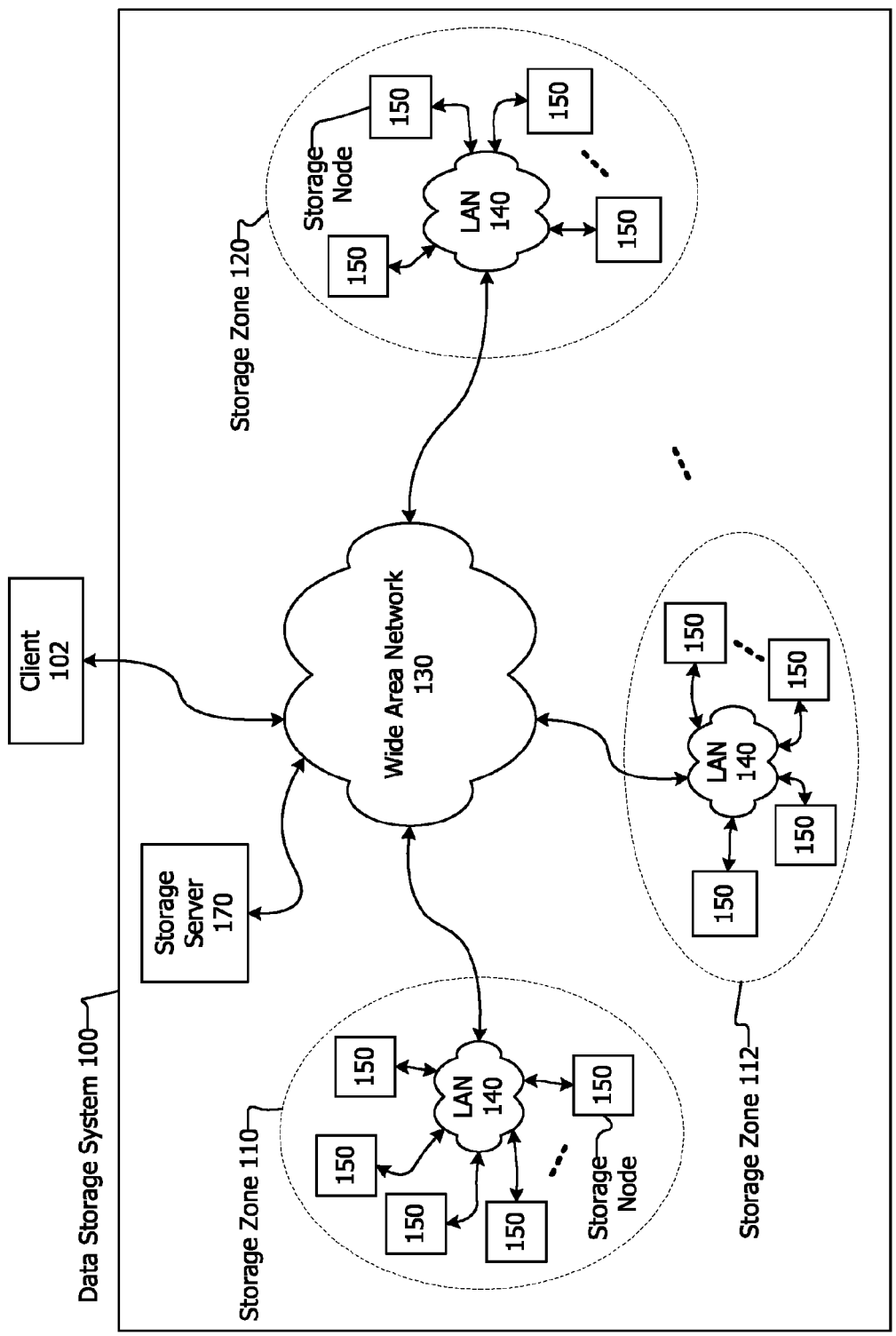
FIG. 1 is a block diagram of a data storage system.

FIG. 1 is a block diagram of a data storage system 100. The data storage system 100 includes at least two storage zones. The data storage system 100 typically includes multiple storage zones that are independent of one another. The storage zones may be autonomous. The storage zones may be in a peer-to-peer configuration. The storage zones may be, and are often, geographically dispersed. In the example shown, the data storage system 100 includes three storage zones, first storage zone 110, second storage zone 112 and third storage zone 120. In other configurations, more than three storage zones are included in the data storage system. The storage zones may replicate data included in other storage zones. The data storage system 100 may be a distributed replicated data storage system.

The storage zones 110, 112 and 120 may be separated geographically, may be in separate states, may be in separate countries, may be in separate cities, may be in the same location, may be in separate racks, may be in separate buildings on a shared site, may be on separate floors of the same building, and arranged in other configurations. The storage zones 110, 112 and 120 communicate with each other and share objects over wide area network 130. The wide area network 130 may be or include the Internet. The wide area network 130 may be wired, wireless, or a combination of these. The wide area network 130 may be public or private, may be a segregated network, and may be a combination of these. The wide area network 130 includes networking devices such as routers, hubs, switches and the like.

The data storage system 100 may include a storage server 170 coupled with wide area network 130. The storage server 170 may augment or enhance the capabilities and functionality of the data storage system by promulgating storage policies, receiving and distributing search requests, compiling and/or reporting search results, and tuning and maintaining the storage system. The storage server 170 may include and maintain an object database on a local storage device included in or coupled with the storage server 170. The object database may be indexed according to the object identifier or OIDs of the objects stored in the data storage system. In various embodiments, the object database may only store a small amount of information for each object or a larger amount of information. Pertinent to this patent is that the object database store policy information for objects. In one embodiment, the object database is an SQLITE® database. In other embodiments, the object database may be a MONGODB®, Voldemort, Cassandra or other key-value store. The objects and the object database may be referenced by object identifiers or OIDs.

The term data as used herein includes a bit, byte, word, block, stripe or other unit of information. In one embodiment, data is stored within and by the distributed replicated data storage system as objects. A data item may be stored as one object or multiple objects. That is, an object may be a data item or a portion of a data item. As used herein, the term data item is inclusive of entire computer readable files or portions of a computer readable file. The computer readable file may include or represent text, numbers, data, images, photographs, graphics, audio, video, raw data, scientific data, computer programs, computer source code, computer object code, executable computer code, and/or a combination of these and similar information.

Many data intensive applications store a large quantity of data; these applications include scientific applications, newspaper and magazine websites (for example, nytimes.com), scientific lab data capturing and analysis programs, video and film creation software, and consumer web based applications such as social networking websites (for example, FACEBOOK® and INSTAGRAM®), photo sharing websites (for example, FLICKR®), geo-location based and other information services such as NOW from Google Inc. and SIRI® from Apple Inc., video sharing websites (for example, YOUTUBE®) and music distribution websites (for example, ITUNES®).

Figure 2:
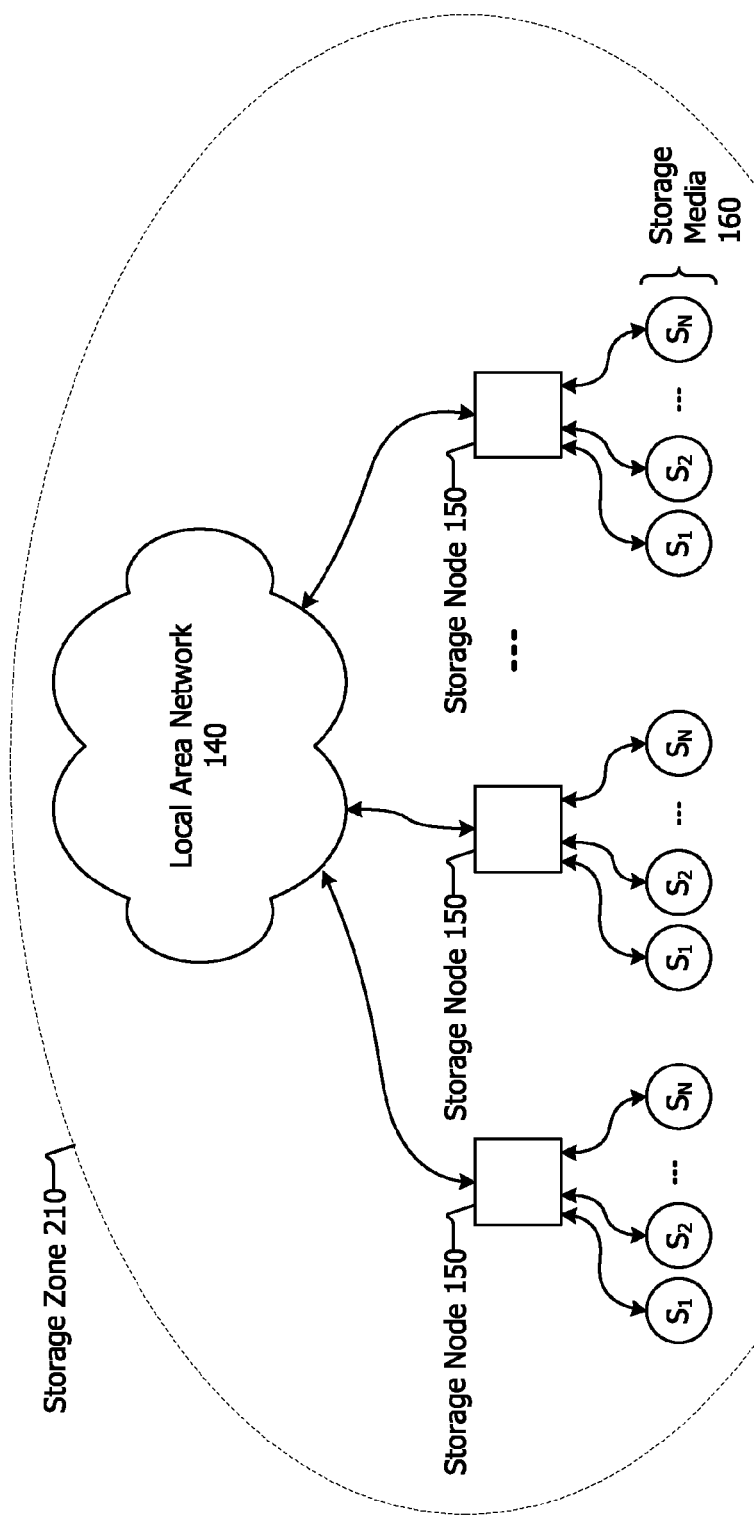
FIG. 2 is a block diagram of a storage zone included in a data storage system.

FIG. 2 is a block diagram of a storage zone 210 included in a data storage system. The storage zones 110, 112 and 120 shown in FIG. 1 are examples of storage zone 210. The storage nodes 150 within a storage zone 210 may be connected via a local area network 140 by wire lines, optical fiber cables, wireless communication connections, and others, and may be a combination of these. The local area network 140 may include one or more networking devices such as routers, hubs, switches and the like.

The storage zones 110, 112, 120 and 210 include a computing device and/or a controller on which software may execute. The computing device and/or controller may include one or more of logic arrays, memories, analog circuits, digital circuits, software, firmware, and processors such as microprocessors, field programmable gate arrays (FPGAs), application specific integrated circuits (ASICs), programmable logic device (PLDs) and programmable logic array (PLAs). The hardware and firmware components of the computing device and/or controller may include various specialized units, circuits, software and interfaces for providing the functionality and features of the data storage system 100. The processes, functionality and features of the data storage system 100 may be embodied in whole or in part in software which operates on a controller and/or one or more computing devices in a storage zone, and may be in the form of one or more of firmware, an application program, object code, machine code, an executable file, an applet, a COM object, a dynamic linked library (DLL), a dynamically loaded library (.so), a script, one or more subroutines, or an operating system component or service, and other forms of software. The hardware and software and their functions may be distributed such that some actions are performed by a controller or computing device, and others by other controllers or computing devices within a storage zone.

To implement the data storage system 100, the controller and/or computing devices that may be included in a primary node (described below) or all nodes include firmware on a re-writeable read-only memory such as an EEPROM. The firmware may be re-programmed, flashed or updated to achieve certain goals of the manufacturer of the data storage system. The goals include, for example, improving performance, adding new features, enhancing existing features and fixing bugs.

A computing device as used herein refers to any device with a processor, memory and a storage device that may execute instructions such as software including, but not limited to, server computers, personal computers, portable computers, laptop computers, smart phones and tablet computers. Storage server 170 is, depending on the implementation, a specialized computing device or general purpose server computer. The computing devices run an operating system, including, for example, versions of the Linux, Unix, MICROSOFT® Windows, Solaris, Symbian, Android, Chrome, and APPLE® Mac OS X operating systems. Computing devices include a network interface in the form of a card, chip or chip set that allows for communication over a wired and/or wireless network. The network interface allows for communications according to various protocols and standards, including, for example, versions of Ethernet, INFINIBAND® network, Fibre Channel, and others. A computing device with a network interface is considered network capable.

Referring again to FIG. 2, the storage zone 210 includes a plurality of storage nodes 150 which include a plurality of storage media 160. Each of the storage nodes 150 may include one or more server computers. Each of the storage nodes 150 may be an independent network attached storage (NAS) device or system. The terms "storage media" and "storage device" are used herein to refer nonvolatile media and storage devices. Nonvolatile media and storage devices are media and devices that allow for retrieval of stored information after being powered down and then powered up. That is, nonvolatile media and storage devices do not lose stored information when powered down but maintain stored information when powered down. Storage media and devices refer to any configuration of hard disk drives (HDDs), solid-states drives (SSDs), silicon storage devices, magnetic tape, optical discs, nonvolatile RAM, carbon nanotube memory, ReRam memristors, and other similar nonvolatile storage media and devices. Storage devices and media include magnetic media and devices such as hard disks, hard disk drives, tape and tape players, flash memory and flash memory devices; silicon-based media; nonvolatile RAM including memristors, resistive random-access memory (ReRam), and nano-RAM (carbon nanotubes) and other kinds of NV-RAM; and optical disks and drives such as DVD, CD, and BLU-RAY® discs and players. Storage devices and storage media allow for reading data from and/or writing data to the storage device/storage medium. Hard disk drives, solid-states drives and/or other storage media 160 may be arranged in the storage nodes 150 according to any of a variety of techniques.

The storage media 160 included in a storage node 150 may be of the same capacity, may have the same physical size, and may conform to the same specification, such as, for example, a hard disk drive specification. Example sizes of storage media include, but are not limited to, 2.5" and 3.5". Example hard disk drive capacities include, but are not limited to, 1, 2 3 and 4 terabytes. Example hard disk drive specifications include Serial Attached Small Computer System Interface (SAS), Serial Advanced Technology Attachment (SATA), and others. An example storage node may include 16 three terabyte 3.5" hard disk drives conforming to the SATA standard. In other configurations, the storage nodes 150 may include more and fewer drives, such as, for example, 10, 12, 24 32, 40, 48, 64, etc. In other configurations, the storage media 160 in a storage node 150 may be hard disk drives, silicon storage devices, magnetic tape devices, other storage media, or a combination of these, and may also be the other storage media listed above. In some embodiments, the physical size of the media in a storage node may differ, and/or the hard disk drive or other storage specification of the media in a storage node may not be uniform among all of the storage devices in a storage node 150.

The storage media 160 in a storage node 150 may be included in a single cabinet, rack, shelf or blade. When the storage media in a storage node are included in a single cabinet, rack, shelf or blade, they may be coupled with a backplane. A controller may be included in the cabinet, rack, shelf or blade with the storage devices. The backplane may be coupled with or include the controller. The controller may communicate with and allow for communications with the storage media according to a storage media specification, such as, for example, a hard disk drive specification. The controller may include a processor, volatile memory and non-volatile memory. The controller may be a single computer chip such as an FPGA, ASIC, PLD and PLA. The controller may include or be coupled with a network interface.

In one embodiment of a data storage system, a controller for a node or a designated node, which may be called a primary node, may handle coordination and management of the storage zone. The coordination and management handled by the controller or primary node includes the distribution and promulgation of storage and replication policies. The controller or primary node may participate in implementing the processes described herein. The controller or primary node may communicate with a server, such as storage server 170, and maintain and provide local system health information to the requesting server.

In another embodiment of a data storage system, multiple storage nodes 150 are included in a single cabinet or rack such that a storage zone may be included in a single cabinet. When in a single cabinet or rack, storage nodes and/or constituent storage media may be coupled with a backplane. A controller may be included in the cabinet with the storage media and/or storage nodes. The backplane may be coupled with the controller. The controller may communicate with and allow for communications with the storage media. The controller may include a processor, volatile memory and non-volatile memory. The controller may be a single computer chip such as an FPGA, ASIC, PLD and PLA.

The rack, shelf or cabinet containing a storage zone may include a communications interface that allows for connection to other storage zones, a computing device and/or to a network. The rack, shelf or cabinet containing a storage node 150 may include a communications interface that allows for connection to other storage nodes, a computing device and/or to a network. The communications interface may allow for the transmission of and receipt of information according to one or more of a variety of wired and wireless standards, including, for example, but not limited to, universal serial bus (USB), IEEE 1394 (also known as FIREWIRE® and I.LINK®), Fibre Channel, Ethernet, WiFi (also known as IEEE 802.11). The backplane or controller in a rack or cabinet containing a storage zone may include a network interface chip, chipset, card or device that allows for communication over a wired and/or wireless network, including Ethernet. The backplane or controller in a rack or cabinet containing one or more storage nodes 150 may include a network interface chip, chipset, card or device that allows for communication over a wired and/or wireless network, including Ethernet. In various embodiments, the storage zone, the storage node, the controller and/or the backplane provide for and support 1, 2, 4, 8, 12, 16, 32, 48, 64, etc. network connections and may have an equal number of network interfaces to achieve this.

The techniques discussed herein are described with regard to storage media and storage devices including, but not limited to, hard disk drives, magnetic tape, optical discs, and solid-state drives. The techniques may be implemented with other readable and writable optical, magnetic and silicon-based storage media as well as other storage media and devices described herein.

In the data storage system 100, files and other data are stored as objects among multiple storage media 160 in storage nodes 150. Files and other data are partitioned into smaller portions referred to as objects. The objects are stored among multiple storage nodes 150 in a storage zone. In one embodiment, each object includes a storage policy identifier and a data portion. The object including its constituent data portion may be stored among storage nodes and storage zones according to the storage policy specified by the storage policy identifier included in the object. Various policies may be maintained and distributed or known to the nodes in all zones in the distributed data storage system 100. The policies may be stored on and distributed from a client 102 to the data storage system 100 and to all zones in the data storage system and to all nodes in the data storage system. The policies may be stored on and distributed from storage server 170 to the data storage system 100 and to all zones in the data storage system and to all nodes in the data storage system. The policies may be stored on and distributed from a primary node or controller in each storage zone in the data storage system. The policies may be stored by and distributed among one, some or all of client 102, storage server 170 and controllers within the storage zones.

As used herein, policies specify replication and placement for objects among the storage nodes and storage zones of the data storage system. In some versions of the system, the policies may specify additional features and components. The replication and placement policy defines the replication and placement of data objects in the data storage system. Example replication and placement policies include, full distribution, single copy, single copy to a specific zone, copy to all zones except a specified zone, copy to half of the zones, copy to zones in certain geographic area(s), copy to all zones except for zones in certain geographic area(s), as well as various forms of erasure encoding, and others. A character (e.g., A, B, C, etc.) or number (0, 1, 2, etc.) or combination of one or more characters and numbers (A1, AAA, A2, BC3, etc.) or other scheme may be associated with and used to identify each of the replication and placement policies. The policy may be specified by a policy identifier stored as a byte or word, where a byte is 8 bits and where a word may be 16, 24, 32, 48, 64, 128, or other number of bits.

The policy is included as a policy identifier in an object identifier (OID) shown in FIG. 3 (described below) as policy identifier 308 in object identifier 300. Storage policies may be pre-defined by the system upon initial configuration may be static, may be user specified upon initial installation, may be modified by users as needed, may be hard coded or unalterable, and may be derived, modified and altered with or without user intervention. In some implementations, the data storage system may allow a system administrator or system user to specify policies as production, lesser priority or higher priority. A production or high priority policy may require the data be available at all times, while lesser priority policies such as, for example, development or test policies require the data be available at less than all times, such as for example 50%, 80 or 90% of the time. In some implementations, priority of a policy may be automatically detected from examination of various factors including one or more of the data item itself, meta data, data Input/Output pattern, the identity of the client accessing or ingesting data, replication zone, replication type, and others. Such policy priority can be used to make various decisions in the system. The upgrade methods described herein may take in to account the policy priority when scheduling upgrades. In this way, higher priority policies are completely not affected or remain least affected while some lower priorities may be affected.

Referring again to FIG. 1, the client 102 of the storage system 100 may be a computing device such as, for example, a thin client such a personal computer, tablet, mobile phone, or workstation or server with limited performance capabilities and storage, or a robust client, such as, for example, a workstation or server with relatively large performance capabilities with large numbers of processors, memory and storage, and may be a group of computers or computing nodes arranged as a super computer. A robust client may have, for example 4, 8 10, 12 or more processors, gigabytes of RAM and terabytes or petabytes of non-volatile storage. In contrast, a thin client may be a mobile computing device such as a mobile phone or computing table or a standard personal computer, workstation or server with one processor, megabytes of RAM and gigabytes up to a few terabytes of storage. The wide area network 130 may connect geographically separated storage zones. Each of the storage zones includes a local area network 140.

The data storage systems and methods described herein may be useful in data storage systems with partial replication in which data is replicated in one or more additional storage zones in addition to an initial storage zone to provide a limited amount of redundancy such that access to data is possible when a zone goes down or is impaired or unreachable, without the need for full replication. The partial replication configuration does not require that each zone have a full copy of all data objects.

To facilitate the management and replication of objects in the data storage system, an object database on the storage server 170 may store information about each object. The object database may be indexed according to the object identifier or OIDs of the objects. The object database may be an SQLITE® database. In other embodiments the database may be, for example, a MONGODB®, Voldemort, Cassandra or other key-value store. The objects and the object database may be referenced by object identifiers or OIDs like those shown and described regarding FIG. 3.

Figure 3:
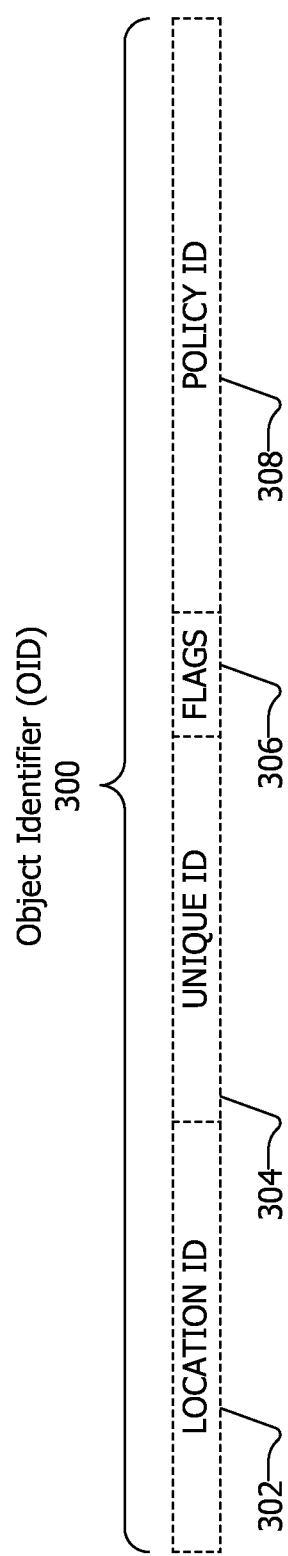
FIG. 3 is a block diagram of an object identifier.

Referring now to FIG. 3, a block diagram of an object identifier 300 used in the data storage system is shown. According to the data storage system described herein, an object identifier 300 includes four components and may include three or more components. The object identifier 300 includes a location identifier 302, a unique identifier 304, flags 306 and a policy identifier 308. The object identifier 300 may optionally include flags 306 and other fields. The location identifier 302 specifies a device, address, storage node or nodes where an object resides. The specific format of the location identifier may be system dependent.

In one version of a data storage system, the location identifier 302 is 30 bits, but may be other sizes in other implementations, such as, for example, 24 bits, 32 bits, 48 bits, 64 bits, 128 bits, 256 bits, 512 bits, etc. In one version of the system, the location identifier 302 includes both a group identifier ("group ID") and an index. The group ID may represent a collection of objects stored under the same policy, and having the same searchable metadata fields; the group ID of the object becomes a reference for the embedded database of the object group. The group ID may be used to map the object to a particular storage node or storage device, such as a hard disk drive. The mapping may be stored in a mapping table maintained by the each of the zones of the object storage system. The mapping information is distributed and is hierarchical. More specifically, the system stores a portion of mapping information in memory, and the storage nodes hold a portion of the mapping information in their memory. Master copies of the mapping information are kept on disk or other nonvolatile storage medium on the storage nodes. The master copies of the mapping information are dynamically updated to be consistent with any changes made while the system is active. The index may be the specific location of the object within a zone. The index may refer to a specific location on disk or other storage device.

The unique identifier 304 is a unique number or alphanumeric sequence that is used to identify the object in the storage system. The unique identifier 304 may be randomly generated, may be the result of a hash function of the object itself (that is, the data or data portion), may be the result of a hash function on the metadata of the object, or may be created using another technique. In one embodiment, the unique identifier is assigned by the controller in the storage zones in such a manner that the storage device is used efficiently. The unique identifier 304 may be stored as 24 bits, 32 bits, 64 bits, 128 bits, 256 bits, 512 bits, 1 kilobyte, etc.

The object identifier 300 may optionally include flags 306. Flags 306 may be used to distinguish between different object types by providing additional characteristics or features of the object. The flags may be used by the data storage system to evaluate whether to retrieve or delete objects. In one embodiment, the flags associated with the object indicate if the object is to be preserved for specific periods of time, or to authenticate the client to ensure that there is sufficient permission to access the object. In one version of the system, the flags 306 portion of the OID 300 is 8 bits, but may be other sizes in other implementations, such as, for example, 16 bits, 32 bits, 48 bits, 64 bits, 128 bits, 256 bits, 512 bits, etc.

The policy identifier 308 is described above in para. [0035].

The total size of the object identifier may be, for example, 128 bits, 256 bits, 512 bits, 1 kilobyte, 4 kilobytes, etc. In one embodiment, the total size of the object identifier includes the sum of the sizes of the location identifier, unique identifier, flags, policy identifier, and version identifier. In other embodiments, the object identifier includes additional data that is used to obfuscate the true contents of the object identifier. In other embodiments, other kinds and formats of OIDs may be used.

Processes

Figure 4:
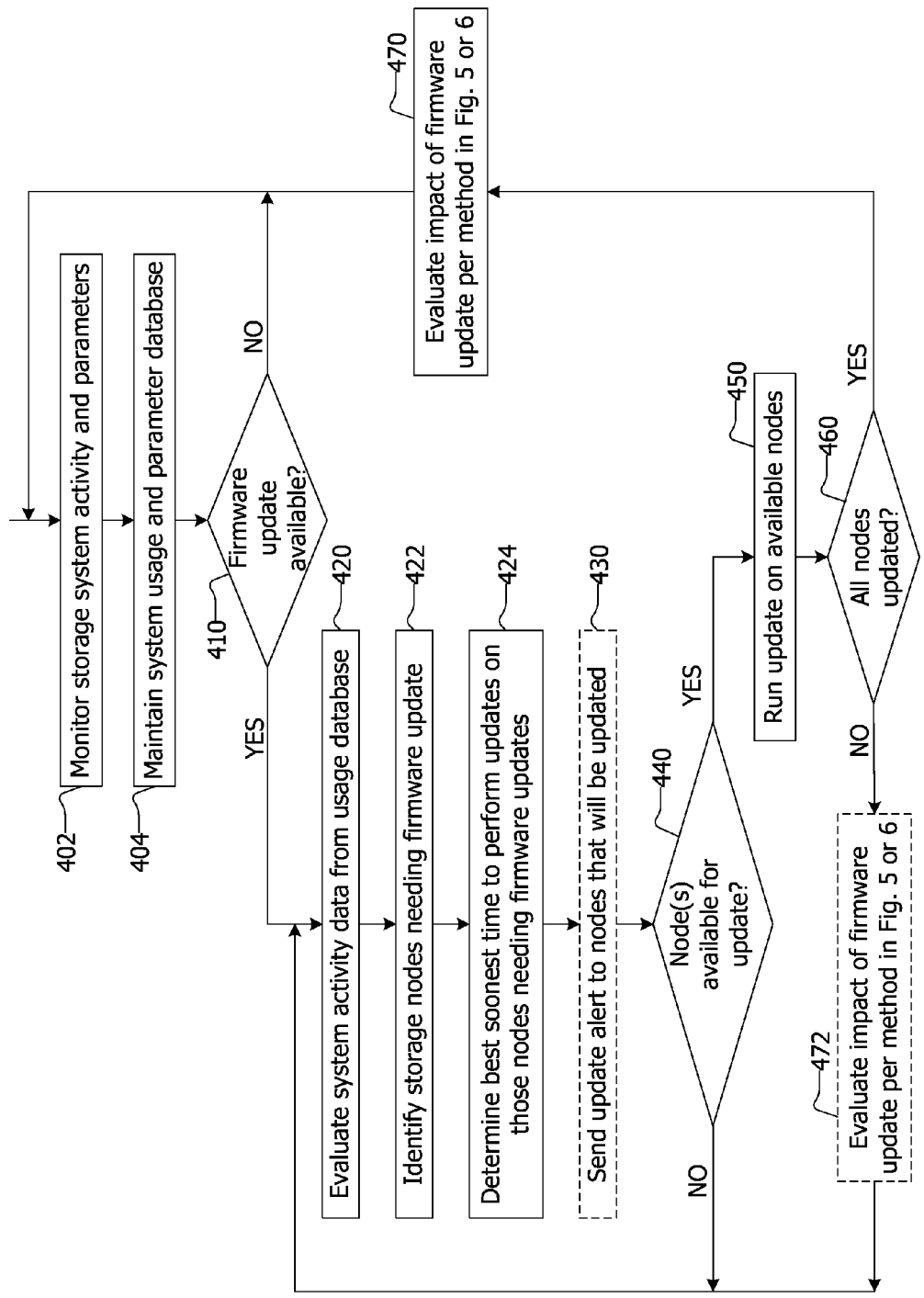
FIG. 4 is a flow chart of the actions taken to implement a firmware update in a data storage system.
Figure 5:
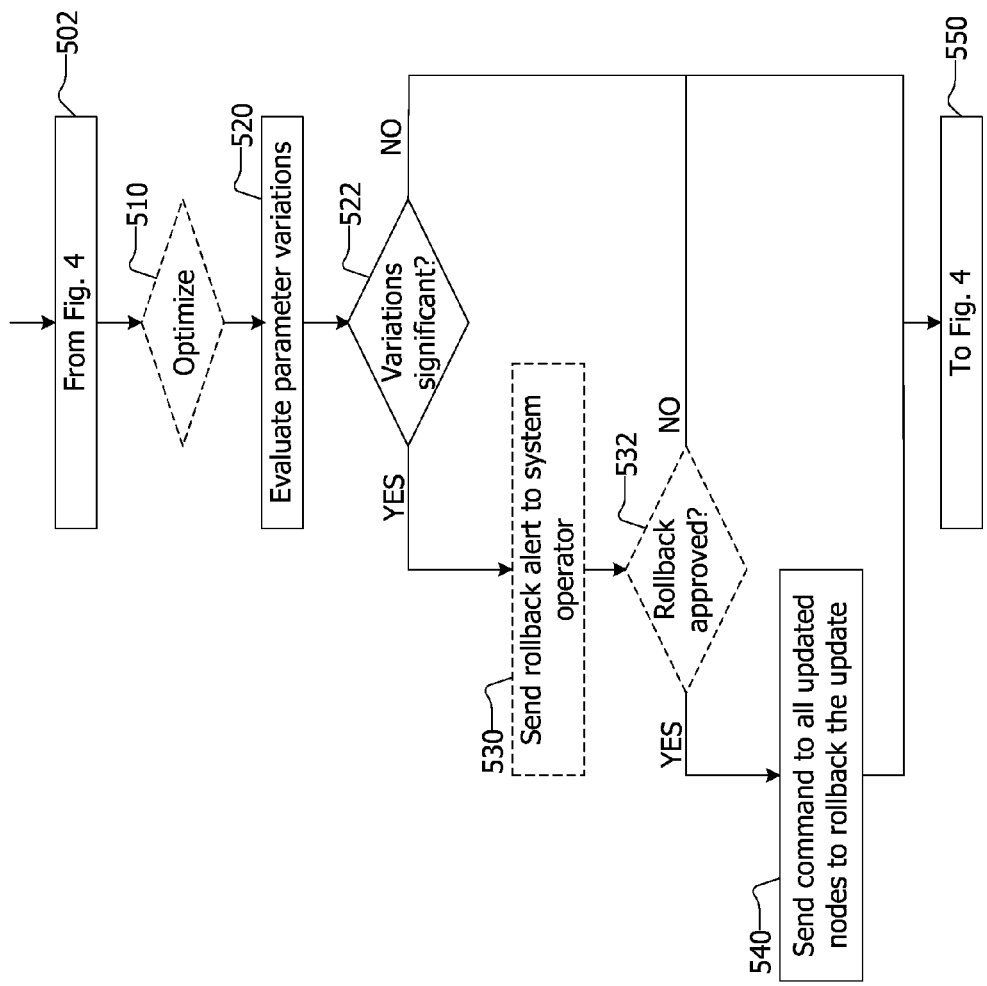
FIG. 5 is a flow chart of a first version of the actions taken to evaluate the impact of a firmware update in a data storage system and determine whether a rollback is needed.
Figure 6:
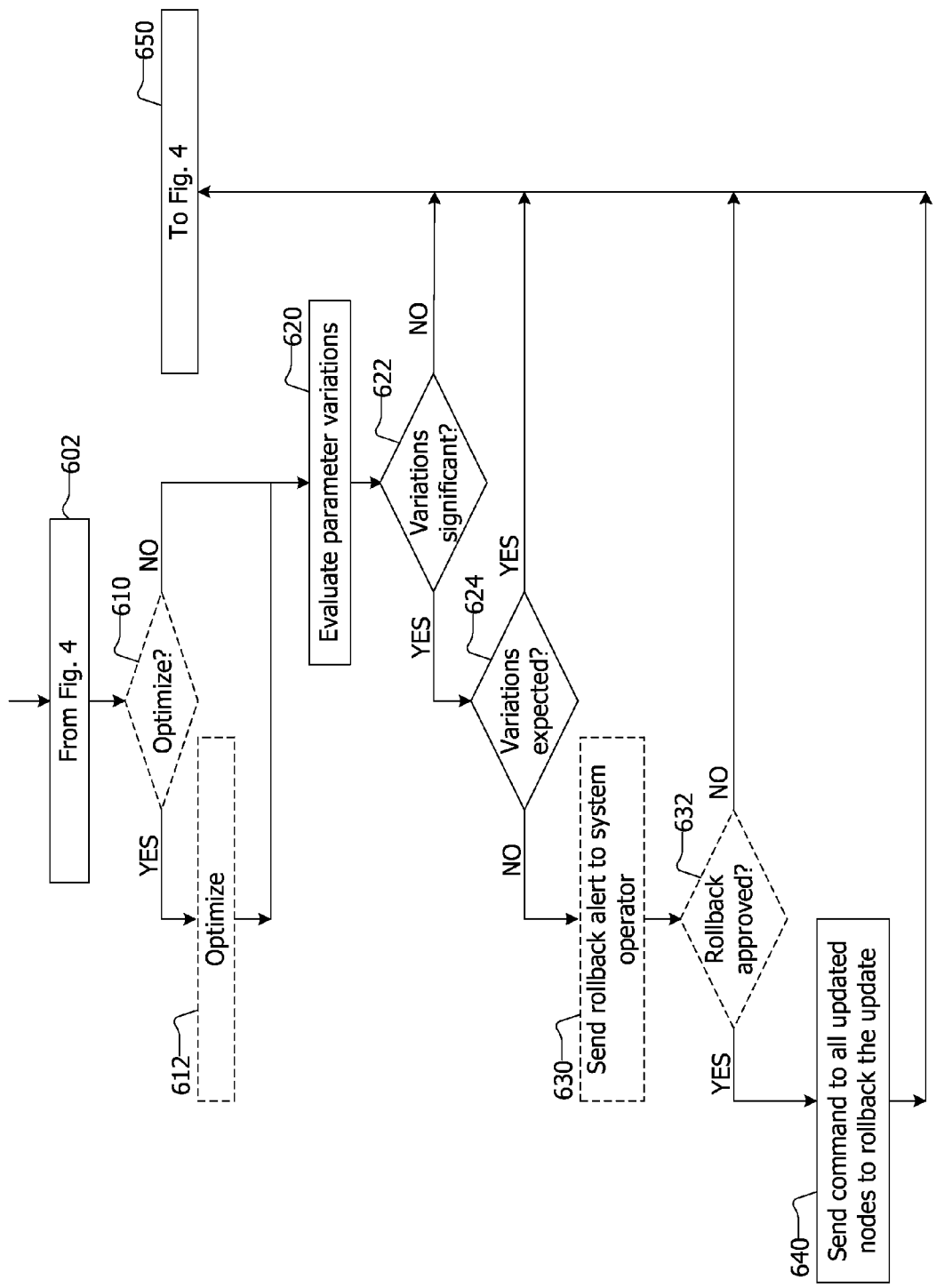
FIG. 6 is a flow chart of a second version of the actions taken to evaluate the impact of a firmware update in a data storage system and determine whether a rollback is needed.

The methods described herein and in particular with regard to FIGS. 4, 5 and 6 are performed by the storage server 170 that sends instructions to, receives information from, and operates in conjunction with controllers or primary nodes in storage zones.

Referring now to FIG. 4, there is shown a flow chart of the actions taken to implement a firmware update in a data storage system. During regular operation of the data storage system, the storage activity of the system and system parameters are monitored, as shown in block 402. A system usage and parameter database is maintained, as shown in block 404, with the storage activity of the nodes and zones in the system as well as with the system parameters. In another embodiment, two databases may be used, one for the system activity and the other for system parameters. The goal of monitoring system activity is to obtain data about when nodes and zones are actively performing operations and when they are inactive. The monitoring also includes regularly storing multiple system parameters of nodes and zones in the system. The system parameters to be monitored and stored may be system defined, system administrator defined, or a combination of these. The system parameters to be monitored and stored may be kept in a list or other group and may be a subset of all available system parameters.

The monitored and stored system parameters may include and be selected from: File Writes Per Second (FWPS); File Reads Per Second (FRPS); File Deletes Per Second (FDPS); File Reservations Per Second (FResPS); put and get throughput; put, get and delete latencies; number of put, get, delete and update failures for a particular time period such as per minute; CPU usage; Memory usage; Network (TCP) backlog; Put, Get and Delete backlog; multipart rate; object update time; drive failure rate; number of client connections to the storage system; as well as internal object or file maintenance activities, durations and backlogs unique to particular systems. This information is referred to herein as activity information. The activity information is stored in a database on the storage server. Primary nodes or controllers in the nodes and zones send the activity information for the particular nodes and/or zones to the storage server. The activity information includes start times and end times of inactive periods in the particular nodes and zones.

A check is made whether there is a pending firmware update available, as shown in block 410. A firmware update may include new firmware, new parameter thresholds, and expected performance values. The system may be programmed to check for a firmware update on a daily, weekly, biweekly, monthly, quarterly or other regular or irregular interval. If no firmware update is available, the system continues to monitor storage system activity and maintain system usage information in the database, as shown in block 402 and 404.

When a firmware update is available, as shown in block 410, system activity data from the usage database is evaluated, as shown in block 420 to identify downtime periods for particular nodes. Storage nodes needing firmware updates are then identified, as shown in block 422. A determination of the best soonest time to perform updates on those nodes needing firmware updates is made, as shown in block 424. This determination is made based on the downtime periods identified in the evaluation of the system activity data from block 420. In addition, additional factors such as consideration of whether nodes are in the same zone are included in the determination. In one embodiment, in view of resiliency consideration of the system, a round robin rolling update schedule is implemented that alternates between zones. In this way, even though the update will be performed during an anticipated downtime, one zone will not be inundated with updates so as to make it unusable. Similarly, a maximum percentage of nodes in a zone that can be updated at any time or within a particular period of time, such as within a few hours or on the same day or within a few days, may be specified. In this way, if there are problems or unintended consequences from the update, the system may identify the problems or unintended consequences before they are implemented throughout the entire zone. A determination of the order or timing of the upgrade may be based on or take into consideration the policy priority. In cases where the system is unable to determine a block of time for upgrading because the system is in continuous use, the scheduling can take advantage of policy priorities. In these cases, the system schedules upgrades on nodes or zones holding data having lesser priority so that the data availability to higher priority data at other nodes or zones is not adversely impacted.

In one embodiment, optionally, an update alert is sent to the system administrator of the storage system notifying the system administrator of scheduled updates, as shown in block 430. This allows a human system administrator to monitor the update and any results of the update.

A check is made whether the node or nodes are available to be updated, as shown in block 440. If the node/s is/are available to be updated, the update is run on the available node or nodes, as shown in block 450. If the node or nodes for which an update is intended is not available, the flow of actions resumes at block 420, described above. After the update is run (block 450), a check is made to learn if all nodes that need updating have been updated, as shown in block 460. If additional nodes need to be updated, as shown in block 460, the flow of actions resumes at block 420, described above. If no additional nodes need to be updated, the flow of actions continues with an evaluation of the impact of the firmware updates, as shown in block 470. In some embodiments, the impact of firmware updates is evaluated before the update has been completed on all nodes, as shown in block 472. The impact of firmware updates in blocks 470 and 472 is evaluated pursuant to the methods described in either FIG. 5 or 6.

FIG. 5 is a flow chart of a first version of the actions taken to evaluate the impact of a firmware update in a data storage system and determine whether a rollback is needed. Initially, parameter optimization performed, as shown in block 510. The optimization is optional (as denoted by the dashed lines) and can be skipped in some implementations of the system. The optimization check takes changes resulting from the firmware update into account and adjusts parameters based on changed necessitated by the firmware update. For example, buffer sizes, cache sizes, packet sizes (for example, maximum transmission unit (MTU)), block sizes, communication speed maximums and minimums and other system dependent variables may need to be modified so that the firmware update performs well. For example, if the upgrade introduces a new feature that allows additional levels of data encryption, the FRPS and throughput are expected to be degraded by some expected percentage or amount due to the additional computation required by the encryption. In this example, the optimization would include accounting for the expected degradation. By performing this optimization, the system alleviates erroneously flagging a rollback due to the FRPS and throughput degradation.

Multiple system parameters are evaluated for variations from expected threshold values and/or prior operating values, as shown in block 520. The firmware update may include new performance parameters, and the evaluation of parameter variations may include a comparison of the post-update performance parameters with the expected new performance parameters provided with the firmware update. In one implementation, the prior operating values and parameters regularly stored during the operation of the system pursuant to blocks 402 and 404 in FIG. 4 are used in the parameter evaluation in block 520. Changes or variations are computed based on current, post-update activity and parameters in comparison to pre-update activity and parameters. The comparison may be made over different snapshots of time depending on the parameter. For example, a by minute, by hour, by day evaluation of latency for a particular zone or node may be computed both pre and post update. If the evaluation shows an increase in latency, the increase may be compared to an acceptable threshold stored by the system. In some versions of the system, depending on the parameter, any increase (or decrease) may be considered unacceptable or not expected.

There are many kinds of calculations that may be used to evaluate parameter variations. Some example calculations follow.

File Writes Per Second (FWPS).

The FWPS value is regularly sampled and stored in a database at the storage server. The moving average FWPS per node is determined over time according to the following.

$$\text{Pre update: } W_{pre} = \frac{1}{n}\sum_{i=1}^{n} w_i$$

where n is the number of samples (here and also in following calculation unless stated otherwise). w is the FWPS measurement, that is, the number of objects written per second, and w>0.

$$\text{Post Update: } W_{post} = \frac{1}{n}\sum_{i=1}^{n} w_i$$

This post update calculation is similar to the pre update calculation as it is a moving average value.

When a node experiences drive failures during the firmware update process, the value of $W_{post}$ is lower. In such cases the calculation is slightly different to account for drive loss.

$$\text{Post Update with drive failure: } W_{post} = \frac{(p+q)}{p}\frac{1}{n}\sum_{i=1}^{n} w_i$$

where p is the number of drives currently active in the node and q is the number of drives that failed in the node during the firmware update.

To calculate whether the parameter variations are significant enough to determine if the firmware update resulted in a degraded system, the following formula may be used.

$$\frac{W_{post} - W_{pre}}{W_{pre}} < \tau$$

where $\tau$ is the threshold which takes into consideration errors in monitoring and evaluation. $\tau$ also takes into consideration any degradation resulting from internal operations such as, for example, drive rebuild, intra-node drive balancing and the like. Ideally $\tau$ should be zero, but considering errors in monitoring, rounding off and related calculations, it may be set to 0.05, which is 5% difference.

FRPS (File Reads Per Second) may be evaluated using the following equations.

$$\text{Pre update: } R_{pre} = \frac{1}{n}\sum_{i=1}^{n} r_i$$

$$\text{Post update: } R_{post} = \frac{1}{n}\sum_{i=1}^{n} r_i$$

These calculations are similar to those used with FWPS. FRPS is directly proportional to the number of drives in the node. The following calculation is used when there is loss of one or more drives in a node.

$$\text{Post update with drive failure: } R_{post} = \frac{(p+q)}{p}\frac{1}{n}\sum_{i=1}^{n} r_i$$

To calculate whether the parameter variations are significant enough to determine if the firmware update resulted in a degraded system, the following formula may be used, where $\tau$ is as with the FWPS calculation.

$$\frac{R_{post} - R_{pre}}{R_{pre}} < \tau$$

The calculation for File Deletes Per Second (FDPS) and File Reservations Per Second (FResPS) are similar to the FRPS and FWPS described above.

Throughput of Put and Get. While the parameters discussed above like FWPS can be affected by the network connection and quality, the throughput is impacted to a greater extent by network anomalies and performance issues. So as not to be overly influenced by network anomalies and performance issues, throughput of Put and Get may be evaluated only at the node level by calculating the amount of information written to disks over a period of timely, namely by evaluating, in one example, the number of bytes written to the disks per second.

$$\text{Pre update: } T_{pre} = \frac{1}{n}\sum_{i=1}^{n} t_i$$

$$\text{Post update: } T_{post} = \frac{1}{n}\sum_{i=1}^{n} t_i$$

Because the throughput at the drive level is being measured, a calculation taking into consideration the case of drive failures during firmware updates applies.

$$\text{Post update, drive failure: } T_{post} = \frac{(p+q)}{p}\frac{1}{n}\sum_{i=1}^{n} t_i$$

To calculate whether the parameter variations are significant enough to determine if the firmware update resulted in a degraded system, the following formula may be used, where $\tau$ is as with the FWPS calculation.

$$\frac{T_{post} - T_{pre}}{T_{pre}} < \tau$$

Node Operation Latency—Put, Get and Delete. There are various latencies in distributed data storage systems. Some of these latencies (such as that at the application level) are measurable only at the client side and can be difficult to monitor, and when monitored, the results may be unreliable. Client side latency is the actual latency for an operation performed on the distributed data storage system. Although it a useful calculation, it is typically unreliable. In contrast, the node operation latency is measured at the nodes on a per operation basis, and as such, is more consistent.

There is also Node to Node Latency which can be measured using a Node to Node latency table maintained by the storage server. The node to node latency may be measured by the nodes themselves and reported to the storage server and may also be maintained by the nodes themselves. The node to node latency is used to determine the replication rate for the distributed data storage system.

$$\text{Pre update: } M_{pre} = \frac{1}{n}\sum_{i=1}^{n} \mu_i$$

$$\text{Post update: } M_{post} = \frac{1}{n}\sum_{i=1}^{n} \mu_i$$

To calculate whether the parameter variations are significant enough to determine if the firmware update resulted in a degraded system, the following formula may be used, where $\tau$ is as with the FWPS calculation.

$$\frac{M_{post} - M_{pre}}{M_{pre}} > \tau$$

Multipart Rate, Object Update Rate.

In the distributed data storage system, the multipart feature allows the user to upload parts of an object for combination into a single object. The amount of time for construction of an object from its constituent parts can be measured and used to determine if there is any degradation in performance after a firmware update is completed. This multipart rate can be measured and stored on the storage server as one of the parameters it maintains. In a distributed data storage system, the object update function allows for modification of an existing object. Object update is similar to put but involves both reading and writing. The object update rate can be measured using a moving average method like that described above.

When multiple parameter values are stored and calculations are performed, an overall determination including the multiple parameters and results of the calculations must be made on a zone by zone basis taking into consideration information about performance of the nodes in the zones. The various parameter calculations discussed above are performed and evaluated per node. To make an overall determination for whether a zone is degraded after a firmware update, the various thresholds for constituent nodes may be combined using the following calculation.

$$\sum_{j=1}^{s} \overline{\omega}^j \left( \sum_{i=1}^{K} \frac{P_{post,i} - P_{pre,i}}{P_{pre,i}} \right) > \Gamma$$

Where $\overline{\omega}$ is the weight that each parameter carries and there are s unique parameters. P represents the particular parameter, for example FWPS(W), throughput (T), etc. K represents the number of nodes in the cluster and $\Gamma$ is the overall threshold. When $\Gamma$ exceeds a system preset value, the rollback is triggered, recommended and/or instituted, depending on the implementation of the system.

Returning back to a discussion of FIG. 5, a check is made whether the variations in system parameters are significant, such that they exceed a threshold value, as shown in block 522. When the variations are significant, the system is considered degraded. The above formulas and evaluations may be used, and other formulations and evaluations may be used. When the variations are not significant, that is, the variations are within expected thresholds, the flow of actions continues to block 550 and the method returns to FIG. 4. Specifically, the flow of actions continues if after block 472 at block 420 or if after block 470 at block 402.

When the variations in system parameters are significant (pursuant to block 522), that is, they exceed a system threshold such that system performance is degraded, optionally, in some implementations, a rollback alert or similar communication may be sent to a system operator, as shown in block 530. The rollback alert may inform the system operator of the parameters that are out of expected thresholds and seek approval to rollback the firmware update. If the rollback is not approved by the system operator, no further action is taken, and the flow of actions continues to block 550 and the method returns to FIG. 4. Specifically, the flow of actions continues if after block 472 at block 420 or if after block 470 at block 402.

If the rollback is approved by the system operator (block 532), a command is sent to all updated nodes to rollback the firmware update, as shown in block 540. The flow of actions continues to block 5, and the method returns to FIG. 4. Specifically, the flow of actions continues if after block 472 at block 420 or if after block 470 at block 402.

In some implementations of the system, when significant variation in the performance parameters is detected in block 522 such that the system performance is degraded, a rollback command is automatically sent to all updated nodes to rollback the firmware update (block 540), skipping blocks 530 and 532.

In another implementation of the system, when the variations in system parameters are significant (pursuant to block 522), a rollback notice or similar communication may be sent to a system operator informing the system operator of the parameters that are out of expected thresholds and stating that a firmware update rollback will commence unless the system operator elects to cancel or opt out of the firmware update rollback.

FIG. 6 is a flow chart of the actions taken to evaluate the impact of a firmware update in a data storage system and determine whether a rollback is needed. Initially, a check whether parameter optimization is needed, as shown in block 610. The optimization is optional (as denoted by the dashed lines) and can be skipped in some versions of the system. The optimization check evaluates whether a parameter value estimation or performance method has changed in a current firmware; optimization in block 612 takes changes into account. For example if a firmware update makes changes to the way the FWPS is estimated, the optimization step adjusts the FWPS calculation method. In addition, as with the method in FIG. 5 described above, the optimization check takes changes resulting from the firmware update into account and adjusts parameters based on changes required by the firmware update.

Multiple system parameters are evaluated for variations, as shown in block 620. These parameters have been regularly stored during the operation of the system pursuant to blocks 402 and 404 in FIG. 4. Changes or variations are computed based on current, post-update activity and parameters in comparison to pre-update activity and parameters. The comparison may be made over different snapshots of time depending on the parameter. For example, a by minute, by hour, by day evaluation of latency for a particular zone or node may be computed both pre and post update. If the evaluation shows an increase in latency, the increase may be compared to an acceptable threshold stored by the system. In some versions of the system, depending on the parameter, any increase (or decrease) may be considered unacceptable or not expected. Additional evaluations and computations like those described above regarding FIG. 5 may be made here too.

A check is made whether the variations in system parameters are significant, as shown in block 622. When the variations are not significant, that is, the variations are within thresholds, the flow of actions continues to block 650 and the method returns to FIG. 4. Specifically, the flow of actions continues if after block 472 at block 420 or if after block 470 at block 402.

When the variations in system parameters are significant (pursuant to block 622), a further check on whether the variations are expected is made as shown in block 624. For example, if added malware checking or extreme encryption is incorporated in a firmware update or some other task requiring additional processing is included in the firmware update, significant variations in certain system parameters may be expected. If the variations are expected, the flow of actions continues to block 650 and the method returns to FIG. 4. Specifically, the flow of actions continues if after block 472 at block 420 or if after block 470 at block 402.

When the variations are not expected, that is they exceed expected thresholds or limits, a command is sent to all updated nodes to rollback the firmware update, as shown in block 640. The flow of actions continues to block 650 and the method returns to FIG. 4. Specifically, the flow of actions continues if after block 472 at block 420 or if after block 470 at block 402.

In another embodiment, prior to initiating rolling back the firmware update, a rollback alert may be sent to a system operator, as shown in block 630 and approval of the rollback is sought. If the rollback is not approved, the flow of actions continues to block 650 and the method returns to FIG. 4. Specifically, the flow of actions continues if after block 472 at block 420 or if after block 470 at block 402.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more.

As used herein, a "set" of items may include one or more of such items.

As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

As used herein, "and/or" means that the listed items are alternatives, but the alternatives also include any combination of the listed items.

It is claimed:

1. A computing device to manage a data storage system, the data storage system including a plurality of storage zones, each storage zone including a plurality of storage nodes, each storage nodes including a plurality of storage media, the computing device comprising:
    a processor;
    a memory coupled with the processor;
    a storage medium having instructions stored thereon which when executed cause the computing device to perform actions comprising:
    monitoring storage system activity and parameters
    maintaining a data storage system usage and parameter database including system activity information
    checking whether a firmware update is available
    when the firmware update is available,
        evaluating data storage system activity from the data storage system usage and parameter database
        identifying storage nodes needing the firmware update
        checking whether storage nodes needing the firmware update are available
        running the firmware update on available storage nodes identified as needing the firmware update
        evaluating the impact of the firmware update on firmware updated storage nodes to determine parameter variations, including comparing at one or more time periods before the firmware update and one or more time periods after the firmware update at least three system parameters selected from the group including node operation latency; node to node latency; file writes per second; file reads per second; file deletes per second; file reservations per second; put and get throughput; put, get and delete latencies; put, get, delete and update failures; put, get and delete backlog; multipart construction rate; and object update rate
        initiating a rollback of the firmware update on all firmware updated storage nodes when the parameter variations of the at least three system parameters each exceed a system threshold.

2. The computing device of claim 1 wherein the storage media are one or more selected from the group including hard disk drives, silicon storage devices and magnetic tape devices.

3. The computing device of claim 1 wherein the computing device is a storage server.

4. The computing device of claim 1 wherein the system activity information includes information about node performance comprising at least three selected from the group including: File Writes Per Second (FWPS); File Reads Per Second (FRPS); File Deletes Per Second (FDPS); File Reservations Per Second (FResPS); put and get throughput; put, get and delete latencies; put, get, delete and update failures for a time period; CPU usage; Memory usage; Network backlog; put, get and delete backlog; multipart rate; object update time; drive failure rate; start times and end times of inactive periods.

5. The computing device of claim 4 wherein checking whether storage nodes needing the firmware update are available includes:
    evaluating the start times and end times of inactive periods for the storage nodes by referring to the system activity information
    scheduling the firmware update for an anticipated inactive time period for the storage nodes.

6. The computing device of claim 1 wherein the storage medium has further instructions stored thereon which when executed cause the computing device to perform further actions comprising:
    optimizing updated storage nodes.

7. The computing device of claim 1:
    wherein maintaining a data storage system usage and parameter database further includes maintaining priority information for data stored in the data storage system
    wherein checking whether storage nodes needing the firmware update are available includes considering the priority of the data stored on the storage nodes.

8. The computing device of claim 1 wherein optimizing updated storage nodes includes adjusting parameters of updated storage nodes based on the firmware update.

9. The computing device of claim 1 wherein initiating a rollback of the firmware update includes:
    sending a rollback alert to a system operator
    receiving a rollback approval from the system operator.

10. A data storage system comprising:
    a plurality of storage zones, each storage zone including a plurality of storage nodes, each storage nodes including a plurality of storage media
    a storage server communicatively coupled with the storage zones, the storage server including a storage medium having instructions stored thereon which when executed cause the storage server to perform actions comprising:
        monitoring storage system activity and parameters
        maintaining a data storage system usage and parameter database including system activity information
        checking whether a firmware update is available
        when the firmware update is available,
            evaluating data storage system activity from the data storage system usage and parameter database
            identifying storage nodes needing the firmware update
            checking whether storage nodes needing the firmware update are available
            running the firmware update on available storage nodes identified as needing the firmware update
            evaluating the impact of the firmware update on firmware updated storage nodes to determine parameter variations, including comparing at one or more time periods before the firmware update and one or more time periods after the firmware update at least three system parameters selected from the group including node operation latency; node to node latency; file writes per second; file reads per second; file deletes per second; file reservations per second; put and get throughput; put, get and delete latencies; put, get, delete and update failures; put, get and delete backlog; multipart construction rate; and object update rate
            initiating a rollback of the firmware update on all firmware updated storage nodes when the parameter variations of the at least three system parameters each exceed a system threshold.

11. The data storage system of claim 10 wherein the storage media are one or more selected from the group including hard disk drives, silicon storage devices and magnetic tape devices.

12. The data storage system of claim 10 wherein the computing device is a storage server.

13. The data storage system of claim 10 wherein the system activity information includes information about node performance comprising at least three selected from the group including: File Writes Per Second (FWPS); File Reads Per Second (FRPS); File Deletes Per Second (FDPS); File Reservations Per Second (FResPS); put and get throughput; put, get and delete latencies; put, get, delete and update failures for a time period; CPU usage; Memory usage; Network backlog; put, get and delete backlog; multipart rate; object update time; drive failure rate; start times and end times of inactive periods.

14. The data storage system of claim 13 wherein checking whether storage nodes needing the firmware update are available includes:
    evaluating the start times and end times of inactive periods for the storage nodes by referring to the system activity information
    scheduling the firmware update for an anticipated inactive time period for the storage nodes.

15. The data storage system of claim 10 wherein the storage medium has further instructions stored thereon which when executed cause the storage server to perform further actions comprising:
    optimizing updated storage nodes.

16. The data storage system of claim 10:
    wherein maintaining a data storage system usage and parameter database further includes maintaining priority information for data stored in the data storage system
    wherein checking whether storage nodes needing the firmware update are available includes considering the priority of the data stored on the storage nodes.

17. The data storage system of claim 10 wherein optimizing updated storage nodes includes adjusting parameters of updated storage nodes based on the firmware update.

18. The data storage system of claim 10 wherein initiating a rollback of the firmware update includes:
    sending a rollback alert to a system operator
    receiving a rollback approval from the system operator.

* * * * *